United States Patent Office 3,202,717
Patented Aug. 24, 1965

3,202,717
METHOD OF OXIDIZING MONO-OLEFINS
Joseph T. Kummer, Midland, Mich., assignor to The Dow Chemical Company, Midland, Mich., a corporation of Delaware
No Drawing. Filed Aug. 4, 1960, Ser. No. 47,394
5 Claims. (Cl. 260—597)

The invention concerns an improved method of preparing a compound containing the carbonyl group employing an acyclic mono-olefin wherein one of the methylene groups comprising the ethylenic linkage in the mono-olefin is converted either to a formyl group or to an oxo (sometimes called keto) group, i.e. the ethylenic linkage of the mono-olefin,

is altered to:

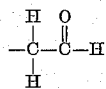

to form the aldehyde in the case of ethylene and to:

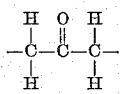

to form a ketone in the case of olefins having more than two carbon atoms per molecule. Hereinafter, the aldehyde or ketone produced will frequently be referred to as the corresponding non-carboxylic carbonyl compound.

Methods of converting a mono-olefin to a compound containing a carbonyl group by oxidation are known, for instance: by the oxidation at an elevated temperature of ethylene or propylene to the corresponding glyoxal employing selenium dioxide as the oxidizing agent; by the oxidation at an elevated temperature of butylene or a higher homologue thereof to maleic acid or maleic anhydride employing a solid catalytic oxide or salt of V, Bi, U, W, Cr, Mn, or Mo; by the oxidation at an elevated temperature of propylene to acrolein employing a vaporous mixture of a mono-olefin, oxygen, and Se metal over a contacting material comprising copper silicate or employing a vaporous mixture of propylene and air over a contacting material comprising tellurium oxide and vanadium oxide. In such known methods there is a tendency for oxidation to be insufficiently controllable or for it to progress further than is desired, resulting in a mixture of oxidation products or in progressing to the formation of some acid or the ultimate oxidation products of $CO_2$ and $H_2O$.

In the preparation of an aldehyde or a ketone by the oxidation of the corresponding mono-olefin, it is desirable that a readily recoverable, substantially pure, single aldehyde or ketone be produced in good yield.

In my copending application S.N. 3,712, filed January 21, 1960, now U.S. Patent 3,133,968, there is described an improved method of preparing an aldehyde or ketone by passing an olefin, alone or together with a substantially inert gas or vapor, such as steam or nitrogen, preferably at a pressure between 50 and 500 p.s.i.g., into or through an acidic aqueous mixture of vanadium compounds, containing at least part of the vanadium in the pentavalent state, while heating the reaction mixture at 100° C. or above, e.g., between 100° C. and 200° C. and preferably between 120° and 180° C. The aldehyde or ketone formed is removed by known means, e.g. by extraction with a water-immiscible solvent therefor or by vaporization. The remaining aqueous solution or mixture of vanadium compounds from which the aldehyde or ketone has been removed may be re-oxidized to provide pentavalent vanadium, e.g. by passing oxygen or air thereinto, and thereafter be re-employed in the production of a further amount of aldehyde or ketone. Although the method of said copending application represents an improvement over theretofore known methods of oxidizing a mono-olefin to an aldehyde or ketone, a more rapid rate of oxidation of the olefin than is attainable by the practice of the invention therein described and over a wider temperature range is desirable.

The present invention is predicated on the discovery that the inclusion of a small but effective amount of palladium metal or a soluble palladium salt in the reaction mixture described in said copending application catalyzes the oxidation process.

It is, accordingly, the principal object of the invention to provide an improved method of oxidizing a mono-olefin to produce the non-carboxylic, carbonyl compound, e.g. ethylene to produce acetaldehyde or of oxidizing propylene or a higher homologue thereof to produce the corresponding ketone.

The manner by which this and related objects are attained will be made clear in the ensuing description and is succinctly defined in the appended claims.

The invention, in its broad sense, is an improved method of producing a compound containing either the formyl group or the oxo group on a carbon atom of an ethylenic linkage. It consists essentially of reacting a mono-olefin, having the ethylenic linkage in the acyclic portion thereof, and an acidic aqueous solution comprising pentavalent vanadium ions, provided therein by admixing at least an average of 0.1 gram atomic weight of chemically combined vanadium per liter of the aqueous solution or mixture, and between 1 and 100 parts by weight, per million parts of said aqueous solution or mixture, of palladium ions provided by admixing therewith either palladium metal or a palladium salt or oxide which is sufficiently soluble in the acidic aqueous solution or mixture to provide the required palladium ions therein. When a lower valent vanadium compound than the pentavalent is used, it must be at least partially oxidized prior to reacting with the mono-olefin. Usually an amount of the vanadium compounds which results in more pentavalent vanadium compounds than will dissolve in the solution to provide a slurry, is used. $PdCl_2$ and $PdSO_4$ are illustrative of palladium salts commonly employed as the source of the palladium ions in the practice of the invention. The temperature and pressure to employ in the practice of the invention are not critical. Any temperature between room temperature and about 200° C. may be employed and any pressure from above atmospheric to 500 p.s.i.g. is satisfactory.

The invention may be carried out in a batchwise mode of operation wherein the mono-olefin is admixed with the aqueous acidic mixture containing pentavalent vanadium ions and palladium ions in a reaction zone for a sufficient time for the oxidation of the mono-olfin to be substantially completed, and the resulting aldehyde or ketone thereby produced recovered from the reaction zone, or it may be carried out in a continuous mode of operation employing a plurality of reaction zones including one for the oxidation of the mono-olefin and a second one for the oxidation and re-oxidation of lower valent vanadium to the pentavalent state, together with suitable feed and circulating means and suitable recovery and purification means for the aldehyde or ketone being produced. The continuous mode of operation is preferred.

The term "solution" when used herein includes not only a true solution but an aqueous slurry or mixture of vanadium compounds wherein a sufficient amount of the compounds goes into solution to yield reactive pentavalent vanadium ions. The term mole as used herein always means gram mole.

Pentavalent vanadium in the aqueous solution may be provided by admixing a pentavalent vanadium compound directly, or it may be provided by admixing a lower valent vanadium compound therewith and oxidizing it to the pentavalent state. The oxidation of the lower valent to pentavalent vanadium proceeds best in a slightly acidic medium to avoid the presence of an undesirably heavy precipitate. Therefore, a limited amount of sulfuric acid, sulfurous acid, their anhydrides or an alkali metal acid salt is usually admixed with the aqueous solution. An aqueous solution comprising, per liter, at least 0.1 mole of a lower valent vanadium compound and at least 0.05 mole of $H_2SO_4$ or 0.1 mole of $NaHSO_4$ or $KHSO_4$ per liter of solution is suggested as an aqueous solution containing tetravalent vanadium suitable for oxidation to the pentavalent state. An aqueous solution containing between 1 and 3 moles of $VOSO_4$ and between 0.05 and 2 moles of $H_2SO_4$ or between 0.1 and 4 moles of an alkali metal acid sulfate per liter is preferred in the practice of the invention. The amount of sulfuric acid or acid sulfate salt may be that which adds between 0.1 and 4 grams atomic weights of hydrogen per liter of solution.

The $VOSO_4$ is usually added in an amount such that, upon subsequent oxidation thereof to the pentavalent vanadium, an excess of the pentavalent vanadium over that which will remain in solution is produced and a precipitate forms therein as a slurry. When the solution containing the slurried precipitate therein is thereafter brought in contact with the mono-olefin, the precipitate dissolves and thereby provides additional pentavalent vanadium ions for oxidation of the mono-olefin.

The preferred practice of the invention is to maintain as high a concentration of the vanadium compounds in the solution containing the slurried precipitate as possible without the undissolved vanadium compounds increasing the viscosity to such extent that problems of satisfactory circulation and agitation arise. Excess palladium metal or a palladium compound, over that which will dissolve, may be present in the aqueous mixture, but such excess serves no useful purpose and the use of any appreciable excess is not recommended.

The oxidation of an aqueous solution of one or more vanadium compounds having a valence of 4 or lower to a condition in which at least a part of the vanadium is pentavalent, can be accomplished in known ways, e.g., by an electrolytic oxidation or by treatment with a chemically reactive oxidizing agent. It is conveniently accomplished by passing oxygen gas or a gas containing elemental oxygen into the aqueous lower valent vanadium solution at a pressure of say 50 to 500 p.s.i.g. while heating at a temperature of 100° or higher, e.g., between 100° and 250° C. For satisfactory practice of the invention at least about 1 percent and usually not more than about 15 percent of the lower valent vanadium in the solution is oxidized to pentavalent ions. Since a minimum of 0.1 gram mole of a lower valent vanadium compound is required to be present and a minimum of 1% or 0.01 thereof need be pentavalent, a minimum of 0.001 gram mole of pentavalent vanadium is required.

However, oxidation of lower valent vanadium to the pentavalent state produces hydrogen ions and, therefore, the solution becomes increasingly acidic as oxidation of the lower valent vanadium proceeds. High acidity of the aqueous solution of vanadium compounds retards the oxidation of the lower valent vanadium compounds.

On the other hand the aqueous solution containing pentavalent vanadium ions and containing palladium ions must be acidic when the olefin is admixed therewith in the practice of the invention or the vanadium will all be substantially removed from solution by precipitation of insoluble vanadium compounds. At low concentrations of vanadium compounds in the aqueous solution, e.g., those not over 1 molar, the rate which an olefin is oxidized becomes greater with increasingly higher hydrogen ion concentrations. However, when relatively higher concentrations of vanadium compounds are employed, the increased rate of oxidations of the olefin accompanying an increase in hydrogen ion concentration becomes less pronounced.

As aforesaid, a high hydrogen ion concentration is undesirable during the oxidation of lower valent vanadium to pentavalent and a high hydrogen concentration is conducive to oxidation of the mono-olefin. However, a hydrogen ion concentration exists in the practice of the invention wherein both oxidation processes proceed in a satisfactory manner. Since the preferred mode of practicing the invention is continuous, thereby requiring successive and preferably uninterrupted repetitive steps of alternate oxidation of lower vanadium compounds to the pentavalent state and the oxidation of a mono-olefin to an aldehyde or ketone, the control of the hydrogen ion concentration to meet both conditions in a continuous operation is important for the successful practice of the invention. A suitable hydrogen ion concentartion in the aqueous solution containing vanadium and palladium ions usually employed, as aforesaid, is that which results from the addition of between 0.05 and 1.0 mole of sulfuric acid per liter of solution. The aqueous mixture thereby produced is in a satisfactorily fluid or pumpable state.

When oxidation is accomplished by the use of gaseous oxygen, unused oxygen gas is usually swept out of the oxidation chamber by passing steam or an inert gas therethrough. This is not essential, but is chiefly done as a safety precaution against the possibility of an explosion or of undesirable side reactions during subsequent oxidation of the mono-olefin.

Examples of mono-olefins that can be oxidized by the practice of the invention to form the corresponding non-carboxylic carbonyl compound are ethylene, propylene, n-butene-1, n-butene-2, n-pentene-1, n-pentene-2, and iso-amylene. Apparently any acyclic mono-olefin can be oxidized in accordance with the invention to form the corresponding aldehyde or ketone in good yield.

In the practice of the invention the corresponding carbonyl compound, i.e. the aldehyde or ketone, is formed by passing the olefin alone or together with a substantially inert gas or vapor, such as argon, steam, or nitrogen, into or through the above-described acidic aqueous solution, containing some palladium and pentavalent vanadium ions in a manner similar to that described in S.N. 3,712 except for the presence of the palladium in the aqueous solution or mixture.

The aldehyde or ketone thus formed may be separated from the mixture in known ways, e.g. those employed in S.N. 3,712. In practice, it is usually vaporized from the mixture by passing a current of steam or other inert gas or vapor, e.g. an excess of the olefin, or nitrogen, or the like, through the mixture and condensing and separating it from the effluent gases or vapors. Other ways in which it can be recovered from the reaction mixture will be evident to those skilled in the art. The aldehyde or ketone thus produced can be subsequently purified, as by fractional distillation.

The remaining aqueous solution or mixture of vanadium compounds from which the aldehyde or ketone product has been removed can be re-oxidized as hereinbefore stated, to convert at least part of the vanadium therein to the pentavalent state. It is then in condition for re-employment in the process for the production of a further amount of the aldehyde or ketone.

The following examples describe a number of ways in which the invention has been practiced but are not to be construed as limiting the scope of the invention. There are also set forth experimental runs which are not in accordance with the invention for the purpose of comparison. Such runs are designated Experimental Runs for Comparative Purposes.

EXPERIMENTAL RUN A FOR COMPARATIVE PURPOSES

Ethylene gas was passed at a pressure of 50 p.s.i.g. and at a rate of 109 cc. per minute (expressed as 0° C. and 760 millimeters absolute pressure) into a reaction vessel containing a stirred aqueous vanadyl sulfate solution that had been prepared by dissolving 20 grams of $VOSO_4 \cdot 2H_2O$ in 240 cc. of water. The reaction vessel containing the solution was provided with a vapor outlet having a relief valve therein for maintaining said pressure on the vessel while permitting the gas to flow therefrom. The outflowing gas was analyzed and no acetaldehyde was found therein; it consisted for the most part of unconsumed ethylene. This comparative run shows that unless the vanadyl sulfate solution is oxidized to provide pentavalent vanadium ions, substantially no acetaldehyde is produced by attempted oxidation of a mono-olefin.

EXPERIMENTAL RUN B FOR COMPARATIVE PURPOSES

An aqueous solution consisting essentially of 2 molar $VOSO_4$ and 0.25 molar $H_2SO_4$ was prepared and placed in a reaction vessel of the type employed in Run A above. Oxygen gas was passed into the solution which was maintained at 120° C., a pressure of 55 p.s.i.g., and a rate of flow of 50 cc. per minute for a half hour, whereby about 15 percent by weight of the tetravalent vanadium was oxidized to the pentavalent. Thereafter, ethylene was passed into 250 cc. of the thus oxidized vanadium solution at an average rate of 200 cc. per minute while the solution was maintained at 100° C. The effluent gas was analyzed and found to be acetaldehyde and unreacted ethylene. The average rate of production of acetaldehyde per minute was $2.2 \times 10^{-6}$ mole.

Example 1

A 1.9 molar $VOSO_4$, 0.2 molar $H_2SO_4$ aqueous solution, to which were admixed 5 parts by weight of Pd (added as $PdSO_4$), per million parts of solution, was placed in a reaction vessel of the type employed in the runs above and oxygen gas passed therethrough for 0.5 hour at 120° C. and 55 p.s.i.g. and an average rate of flow of 55 cc. per minute. About 15 percent of the tetravalent vanadium had then been oxidized to the pentavalent state at the end of this period. Ethylene gas was then passed through 250 cc. of the thus oxygen-treated solution at 100° C. and a pressure of 50 p.s.i.g. and a rate of flow of 200 cc. per minute. The effluent gaseous product made was analyzed and found to consist of almost pure acetaldehyde intermixed with unreacted ethylene. The average rate of production of the acetaldehyde was $3.8 \times 10^{-3}$ mole per minute.

Example 2

The procedure of Example 1 was repeated except that the aqueous solution was a 2 molar $VOSO_4$ and 0.25 molar $H_2SO_4$ and contained 10 p.p.m. of palladium added as $PdCl_2$. Substantially pure acetaldehyde intermixed with unreacted ethylene was again produced but at an increased rate of $6.2 \times 10^{-3}$ mole per minute.

Example 3

The procedure of Example 2 was followed except that the palladium was added in the amount of 90 p.p.m. as $PdSO_4$. Substantially pure acetaldehyde intermixed with unreacted ethylene was again produced but at an increased rate of $10.2 \times 10^{-3}$ mole per minute.

Example 4

The procedure of Example 3 was repeated except that the temperature of the ethylene reaction with the aqueous solution was carried out at 86° C. and at an average pressure of 3 p.s.i.g. The total amount of ethylene consumed was 0.0474 mole and the total amount of acetaldehyde produced was also 0.0474 mole representing a 100 percent yield.

Example 5

A series of runs was made wherein the procedure of Example 4 was followed except that butene-1 was employed instead of ethylene, the time of reaction was 1 hour, the average butene-1 pressure was 15 p.s.i.g., the temperature was varied (as explained hereinbelow), and the palladium was added in excess of that which would dissolve in the solution, as particulate metallic palladium. (The solubility of palladium metal in the aqueous acidic solution at 100° C. is about 40 p.p.m.) The temperatures employed, the weight of butene-1 consumed, the weights of methyl ethyl ketone produced, and the percent yield (calculated as the number of moles theoretically possible from the moles of butene-1 consumed are set out in the table below.

2 M $VOSO_4$, 0.25 N $H_2SO_4$, CONTAINING AN EXCESS METALLIC Pd AQUEOUS MIXTURE, REACTED WITH BUTENE-1 AT 15 P.S.I.G. FOR 1 HOUR

| Temperature in ° C. | Butene-1 consumed, in grams | Methyl ethyl ketone made in grams | Molar percent yield of methyl ethyl ketone based on moles of Butene-1 consumed |
|---|---|---|---|
| 70  | 2.61 | 3.0  | 90 |
| 100 | 2.29 | 2.26 | 77 |
| 100 | 2.47 | 2.45 | 77 |
| 120 | 1.94 | 1.68 | 67 |

Reference to the table shows that an aqueous solution of $VOSO_4$, oxidized to provide pentavalent vanadium, and containing palladium ions provided by metallic palladium and butene-1 passed therethrough in accordance with the practice of the invention, produces methyl ethyl ketone in satisfactory yield. Although the yield is shown to be somewhat lower, when a ketone is being produced at the higher temperatures, the higher temperatures provide a more rapid volatilization of the ketone from the reaction solution.

The first three runs shown in the table were repeated except that the pressure of the butene-1 was maintained at a constant pressure (30 p.s.i.g.) and the rate of production of the methyl ethyl ketone measured. It was found to be 2.4, 1.72, and 1.42 pounds, respectively, of methyl ethyl ketone per hour per cubic foot of the acidic solution.

The examples clearly show that the use of either metallic palladium or a palladium salt to yield palladium ions in an aqueous solution containing pentavalent vanadium ions increased the rate of production of either an aldehyde or a ketone, unaccompanied by any adverse disadvantages, and, accordingly, has important and far-reaching economic significance.

Having described my invention, what I claim and desire to protect by Letters Patent is:

1. In a method of oxidizing acyclic mono-olefins containing from 2 to 5 carbon atoms in the acyclic portion thereof to the corresponding carbonyl compounds selected from the class consisting of aldehydes and ketones wherein said mono-olefin is admixed and reacted with a stirred aqueous acidic mixture, containing as the acidic material a compound selected from the class consisting of sulfuric acid, sulfurous acid, anhydrides of such acids, alkali metal acid salts of such acids, and mixtures of such acids, anhydrides, and salts, in an amount sufficient to provide between about 0.1 and 4.0 gram atomic weights of hydrogen per liter of aqueous acidic mixture, and containing vanadium compounds as the oxidizing agent, which aqueous mixture contains an average of at least 0.1 gram atomic weight of vanadium chemically combined in said vanadium compounds per liter of the aqueous mixture and includes at least 1 percent, by weight of said vanadium compounds, of at least a partially dissolved pentavalent vanadium compound, selected from the class consisting of vanadium pentoxide and oxidation products of vanadyl sulfate, at a temperature between about room temperature and about 200° C. and at a pressure between atmospheric and about 500 p.s.i., the improvement which consists essentially of incorporating in said aqueous acidic mixture and having present during the reaction at least 1 part, per million parts by weight of the mixture, of palladium of a form selected from the class consisting of metallic palladium and palladium salts and oxides having sufficient solubility at the reaction temperature of the mixture to yield at least said 1 part per million of palladium ions in solution.

2. In a method of making acetaldehyde wherein ethylene is oxidized with a stirred aqueous acidic mixture consisting essentially of (a) water, (b) an acidic material selected from the class consisting of sulfuric acid, sulfurous acid, anhydrides of such acids, alkali metal acid salts of such acids and mixtures of such acids, anhydrides, and salts, in an amount sufficient to provide between about 0.1 and 4.0 gram ions of hydrogen per liter of aqueous mixture, and (c) vanadium compounds as the oxidizing agent, in amount sufficient to provide in said aqueous mixture an average of at least 0.1 gram atomic weight of vanadium chemically combined in said vanadium compounds per liter of the aqueous mixture and includes at least 1 percent, by weight of said vanadium compounds, of at least a partially dissolved pentavalent vanadium compound, selected from the class consisting of vanadium pentoxide and oxidation products of vanadyl sulfate, the improvement which consists essentially of incorporating in said aqueous acidic mixture (d) at least 1 part of palladium per million parts of said mixture, and reacting the resulting mixture with the ethylene at a temperature at least as high as room temperature and at least slightly above atmospheric pressure.

3. In a method of making a ketone wherein a $C_3$ to $C_5$ mono-olefin is oxidized in a stirred aqueous acidic mixture consisting essentially of (a) water, (b) an acidic material selected from the class consisting of sulfuric acid, sulfurous acid, anhydrides of such acids, alkali metal acid salts of such acids and mixtures of such acids, anhydrides, and salts, in an amount sufficient to provide between about 0.1 and 4.0 gram ions of hydrogen per liter of aqueous mixture, and (c) vanadium compounds as the oxidizing agent, to provide in said aqueous mixture an average of at least 0.1 gram atomic weight of vanadium chemically combined in said vanadium compounds per liter of the aqueous mixture and includes at least 1 percent, by weight of said vanadium compounds, of at least a partially dissolved pentavalent vanadium compound, selected from the class consisting of vanadium pentoxide and oxidation products of vanadyl sulfate, the improvement which consists essentially of incorporating in said aqueous acidic mixture (d) at least 1 part of palladium per million parts of said mixture, and reacting the resulting mixture with said mono-olefin at a temperature at least as high as room temperature and at least slightly above atmospheric pressure.

4. In a method of oxidizing an acylic mono-olefin containing from 2 to 5 carbon atoms in the acyclic portion thereof to the corresponding carbonyl compound selected from the class consisting of aldehydes and ketones by admixture therewith of an aqueous mixture of at least one vanadium compound, said vanadium being present in an amount sufficient to provide at least 0.1 gram atomic weight of vanadium chemically combined in said vanadium compounds per liter of the aqueous mixture, and includes at least 1 percent, by weight of said vanadium compounds, of at least a partially dissolved pentavalent compound selected from the class consisting of vanadium pentoxide and oxidation products of vanadyl sulfate, and wherein said aqueous mixture containing the thus oxidized vanadium contains an acidifying reagent selected from the class consisting of sulfuric acid, sulfurous acid, anhydrides of such acids and alkali metal acid salts of such acids, and mixtures of such acids, anhydrides, and salts, in an amount sufficient to add between 0.1 and 4 gram atomic weights of hydrogen per liter of said mixture, the improvement which consists essentially of incorporating in the aqueous mixture between 5 parts per million parts by weight of the mixture and an amount in excess of that soluble in said mixture, of a palladium ion-yielding substance selected from the class consisting of metallic palladium and salts and oxides of palladium, and reacting the resulting mixture with said mono-olefin at a temperature between room temperature and about 200° C. at a pressure between slightly above atmospheric and about 500 p.s.i., and recovering the carbonyl compound, selected from the class consisting of aldehydes and ketones so produced.

5. In a continuous method for the production of an intermediate oxidized hydrocarbon product from an acyclic mono-olefin containing from 2 to 5 carbon atoms in the acyclic portion thereof during which a carbonyl group is formed at the ethylenic

linkage by repeatedly circulating through the zones hereinafter mentioned an aqueous mixture of vanadium compounds as the oxidizing agent which aqueous mixture contains an average of at least 0.1 gram atomic weight of vanadium chemically combined in said vanadium compounds per liter of the aqueous mixture and includes at least 1 percent, by weight of said vanadium compounds, of at least a partially dissolved pentavalent vanadium compound selected from the class consisting of vanadium pentoxide and oxidation products of vanadyl sulfate, and between 0.05 and 2.0 moles of sulfuric acid per liter of said mixture, the improvement which consists essentially of incorporating in said aqueous mixture a palladium-containing substance in an amount sufficient to provide between 1 and 100 parts, per million of said mixture, of palladium, and passing the resulting mixture through a series of zones comprising: (1) an oxygen-treating zone wherein said aqueous mixture is contacted, at a temperature between room temperature and 250° C. and at a pressure of from about 50 to 500 p.s.i.g., with a gas containing elemental oxygen, whereby at least part of the vanadium is oxidized to the pentavalent state; (2) a gas-stripping zone wherein the aqueous mixture is purged of unconsumed oxygen gas by passage of a chemically inactive gas therethrough; (3) a reaction zone wherein a mono-olefin is admixed with said aqueous mixture at a temperature between about 20° and 200° C. and a pressure of between about 50 and 500 p.s.i.g. to convert one of the carbon-hydrogen groups comprising the ethylenic linkage of said mono-olefin to the carbonyl group; and (4) a volatilization zone wherein the carbonyl-containing compound so formed is vaporized from the aqueous mixture and discharged from the volatilization zone; and concurrently feeding additional oxygen-containing gas into said oxygen-treating zone, the mono-olefin into said reaction zone, and the chemically inactive gas through said gas-stripping zone.

(References on following page)

References Cited by the Examiner

UNITED STATES PATENTS

| | | | |
|---|---|---|---|
| 1,999,620 | 4/35 | Van Peski et al. | |
| 2,197,101 | 4/40 | Eaglesfield | 260—592 |
| 3,080,426 | 3/63 | Kirshenbaum et al. | 260—604 |
| 3,133,968 | 5/64 | Kummer | 260—597 |

FOREIGN PATENTS 1,210,009  9/59  France.

OTHER REFERENCES

Chemical Engineering, vol. 66, No. 11, June 1959, pp. 33–35.

Smidt et al., German application 1,061,767, printed July 23, 1959 (KL. 12o 7/03).

Smidt et al.: Angewandte Chemie, vol. 71, No. 5, March 7, 1959, pp. 176–182.

LEON ZITVER, *Primary Examiner.*

CHARLES B. PARKER, *Examiner.*